No. 878,730. PATENTED FEB. 11, 1908.
F. A. JOHNSON & T. A. SMITH.
HORSESHOE PAD.
APPLICATION FILED OCT. 7, 1907.
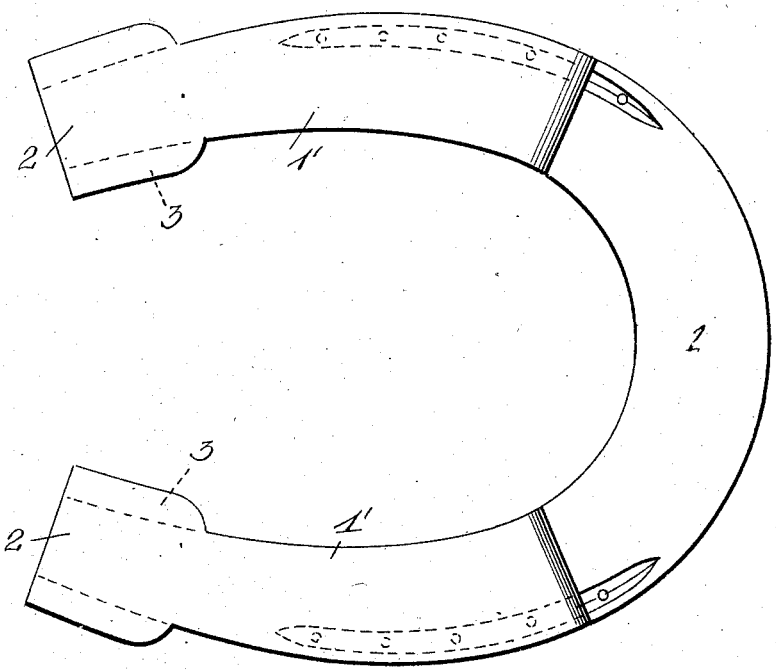
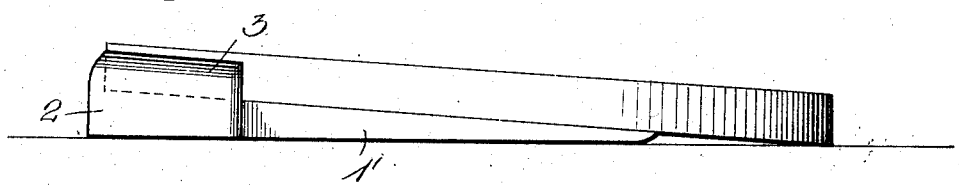
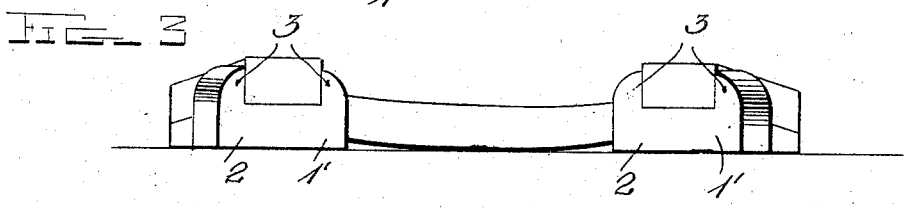
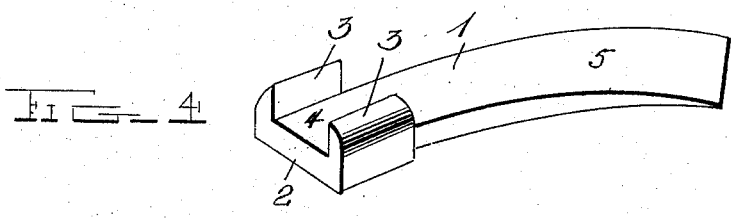
Witnesses
Inventors
Frank A. Johnson
and Thomas A. Smith
by H. B. Willson & Co.
Attorneys

UNITED STATES PATENT OFFICE.

FRANK A. JOHNSON AND THOMAS A. SMITH, OF HOT SPRINGS, SOUTH DAKOTA; SAID JOHNSON ASSIGNOR TO SAID SMITH.

HORSESHOE-PAD.

No. 878,730.  Specification of Letters Patent.  Patented Feb. 11, 1908.

Application filed October 7, 1907. Serial No. 396,283.

*To all whom it may concern:*

Be it known that we, FRANK A. JOHNSON and THOMAS A. SMITH, citizens of the United States, residing at Hot Springs, in the county of Fall River and State of South Dakota, have invented certain new and useful Improvements in Horseshoe-Pads; and we do declare the following to be a full, clear, and exact description of the invention, such as will enable others skilled in the art to which it appertains to make and use the same.

This invention relates to improvements in horseshoe pads.

The object of the invention is to provide an elastic pad adapted to be applied to the heel of a horseshoe to prevent the horse from slipping sidewise.

A further object of the invention is to relieve the concussion when traveling on hard streets and to prevent contraction of the hoof.

With the foregoing and other objects in view, the invention consists of certain novel features of construction, combination and arrangements of parts, as will be more fully described and particularly pointed out in the appended claims.

In the accompanying drawings: Figure 1 is a bottom plan view of a horseshoe showing the application of the pads thereto. Fig. 2 is a side view of the shoe showing a pad in place. Fig. 3 is a rear end view of the same; and Fig. 4 is a detail perspective view of one of the pads removed from the shoe.

Referring to the drawings the numeral 1 denotes a horseshoe having on opposite sides counter-sunk grooves provided with nail holes.

My invention comprises rubber pads for the heel portions of the shoes having on its outer end a thickened portion provided on opposite sides with upwardly extended projections 3, having inwardly curved terminals. Between these projections 3, is provided a channel 4, as shown in Fig. 4. The pad is further provided with an extension 5, which is curved to conform to the curvature of the shoe. The pad from its outer end decreases in thickness to provide a reduced terminal inner end. To apply the pad to the shoe, the heel ends thereof are inserted in the channel 4, and forced out until the ends of the shoe are flush with the outer ends of the pad, the extension serving to contact with the bottom surface of the shoe and also to cover a plurality of the holes in the grooves of the shoe, and the nails that serve to fasten the shoe to the hoof of the animal are driven through the extension of the pad and also through the nail holes in the grooves of the shoe and into the hoof of the animal.

Having thus described our invention, what we claim as new and desire to secure by Letters-Patent, is:

In combination with a horseshoe with the usual countersunk grooves having nail holes therein, a rubber heel pad for the shoe comprising a thickened rear portion having on opposite sides upwardly extended projections provided with a channel therebetween, the pad having a forward extension which is curved to conform to the curvature of the shoe and further constructed so as to decrease in thickness from its rear end to provide a reduced terminal to the extension, the heel end of the shoe serving to be inserted in the channel so that the ends thereof will be flush with the rear thickened end of the pad, said extension serving to contact with the bottom surface of the shoe and arranged over the nail holes of the same, to receive nails inserted through the extension and through the nail holes and into the hoof of the animals, substantially as specified.

In testimony whereof we have hereunto set our hand in presence of two subscribing witnesses.

FRANK A. JOHNSON.
THOMAS A. SMITH.

Witnesses:
AMOS SMITH,
G. O. SMITH.